US011905870B2

(12) United States Patent
Grace et al.

(10) Patent No.: US 11,905,870 B2
(45) Date of Patent: Feb. 20, 2024

(54) CATALYTIC ELEMENT WITH INDUCTIVE HEATER

(71) Applicant: UNIFRAX I LLC, Tonawanda, NY (US)

(72) Inventors: James D. Grace, Lockport, NY (US); Mark E. Beauharnois, Lockport, NY (US); Adam M. Nohel, Sylvania, OH (US); Michael Robert Carson, Jr., Tonawanda, NY (US); Dakota Piehler, Tonawanda, NY (US); Donald John Daniels, IV, Amherst, NY (US); Maurice Y. Belisle, Buffalo, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 0 days.

(21) Appl. No.: 18/319,068

(22) Filed: May 17, 2023

(65) Prior Publication Data

US 2023/0358156 A1 Nov. 9, 2023

Related U.S. Application Data

(63) Continuation of application No. PCT/US2023/065797, filed on Apr. 14, 2023.

(Continued)

(51) Int. Cl.
*F01N 3/28* (2006.01)
*F01N 3/20* (2006.01)

(Continued)

(52) U.S. Cl.
CPC ......... *F01N 3/2013* (2013.01); *F01N 3/2839* (2013.01); *H05B 6/06* (2013.01); *H05B 6/36* (2013.01)

(58) Field of Classification Search
CPC . F01N 3/2013; F01N 2240/16; F01N 2470/24
See application file for complete search history.

(56) References Cited

U.S. PATENT DOCUMENTS

| | | | | |
|---|---|---|---|---|
| 3,768,982 A | | 10/1973 | Kitzner et al. | |
| 4,829,766 A | * | 5/1989 | Henkel | F01N 3/022 60/303 |

(Continued)

FOREIGN PATENT DOCUMENTS

| | | | | | |
|---|---|---|---|---|---|
| JP | 10196351 A | * | 7/1998 | | F01N 13/017 |
| KR | 200315833 Y1 | * | 6/2003 | | |

(Continued)

OTHER PUBLICATIONS

Machine translation of KR-200315833-Y1, accessed Nov. 1, 2023. (Year: 2023).*

(Continued)

*Primary Examiner* — Jonathan R Matthias
(74) *Attorney, Agent, or Firm* — Haynes and Boone, LLP; Randall C Brown; Michael J. Tobin

(57) ABSTRACT

Catalytic elements are usable in waste gas control processes. The catalytic elements include an open inlet into a hollow body and a closed end thereby forcing fluid or gas through a porous catalytic layer of the element. The catalytic layer includes inorganic fibers and a catalyst disposed on or incorporated into the fibers. The catalytic element also includes an inductive heater disposed therein and a conductive layer about the inductive heater to transfer heat to the catalyst and fluid or gas.

20 Claims, 8 Drawing Sheets

Related U.S. Application Data

(60) Provisional application No. 63/363,432, filed on Apr. 22, 2022.

(51) Int. Cl.
*H05B 6/06* (2006.01)
*H05B 6/36* (2006.01)

(56) References Cited

U.S. PATENT DOCUMENTS

| | | | | |
|---|---|---|---|---|
| 5,569,455 | A | 10/1996 | Fukui et al. | |
| 10,612,440 | B2 | 4/2020 | Wang et al. | |
| 2003/0175196 | A1* | 9/2003 | Blackwell | H05B 6/108 423/376 |
| 2010/0212302 | A1* | 8/2010 | Kim | F01N 13/0097 60/299 |
| 2014/0212339 | A1* | 7/2014 | Kaneda | F01N 3/2828 422/173 |
| 2017/0320013 | A1 | 11/2017 | Fernando | |
| 2017/0341004 | A1 | 11/2017 | Miller et al. | |
| 2018/0252135 | A1 | 9/2018 | Crawford et al. | |
| 2019/0309455 | A1 | 10/2019 | Cross et al. | |
| 2022/0088577 | A1 | 3/2022 | Siters et al. | |

FOREIGN PATENT DOCUMENTS

| | | | |
|---|---|---|---|
| KR | 200315834 | Y1 * | 6/2003 |
| KR | 20130071966 | A * | 7/2013 |

OTHER PUBLICATIONS

International Search Report and Written Opinion issued by the United States Patent and Trademark Office as International Searching Authority for International Application No. PCT/US2023/065797, dated Aug. 25, 2023. (9 pgs.).

* cited by examiner

CATALYTIC ELEMENT WITH INDUCTIVE HEATER

CROSS-REFERENCE TO RELATED APPLICATIONS

This application is a continuation of PCT International Patent Application No. PCT/US2023/065797 filed Apr. 14, 2023, which claims priority to U.S. Provisional Application No. 63/363,432 filed Apr. 22, 2022, the contents of which are herein incorporated in their entirety.

TECHNICAL FIELD

The present disclosure relates to catalytic elements including fiber compositions, such as catalytic fiber compositions, for use in waste gas treatment, such as in a catalytic converter for a vehicle. More particularly, the disclosure is related to catalytic elements including an inductive heater for emissions control of waste gas streams.

BACKGROUND

Internal combustion engines, which may be used in numerous systems, generate electrical and/or motive power by combusting fuels, such as gasoline or diesel fuel. These processes are capable of generating waste gases which must be processed to a degree prior to discharge to the environment. These waste gases may include carbon monoxide, carbon dioxide, nitrogen oxides, nitrous oxide, ammonia slip, sulfur oxides, hydrogen chloride, hydrogen fluoride, arsenic, boron, lead, mercury, and other harmful gases (e.g., unburned hydrocarbons ("HC") and volatile organic compounds ("VOC")) and/or particles. Some or all of these undesirable components of waste gases may be removed by various conventional techniques, many of which involve filters and/or catalyst supports which may physically remove and/or chemically alter the undesirable components prior to discharge to the environment.

Many of the conventional components for conducting these abatement processes suffer from deficiencies. For example, in certain circumstances, ceramic honeycomb filters/catalyst supports are used to remove and/or chemically modify undesirable components found in exhaust gases. These supports may be undesirably heavy, may have low heat tolerance, and/or may be expensive to install and/or operate.

Another issue in catalysis of waste gases is that some exothermic reactions do not become spontaneous until a "light-off" temperature is reached. For dense, heavy catalyst supports, the added thermal mass of the support further extends the time until light-off. In some applications, this may lead to waste gases being passed through the filter substantially untreated for several minutes or more.

What is needed is light-weight, high temperature resistant, lower cost and/or energy efficient components for waste gas treatment systems. Such product forms may be capable of replacing existing ceramic substrates such as spheres, powders, or monoliths with such compositions/product forms.

BRIEF DESCRIPTION OF DRAWINGS

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

DETAILED DESCRIPTION

The following descriptions are provided to explain and illustrate embodiments of the present disclosure. The described examples and embodiments should not be construed to limit the present disclosure.

Figure 1:
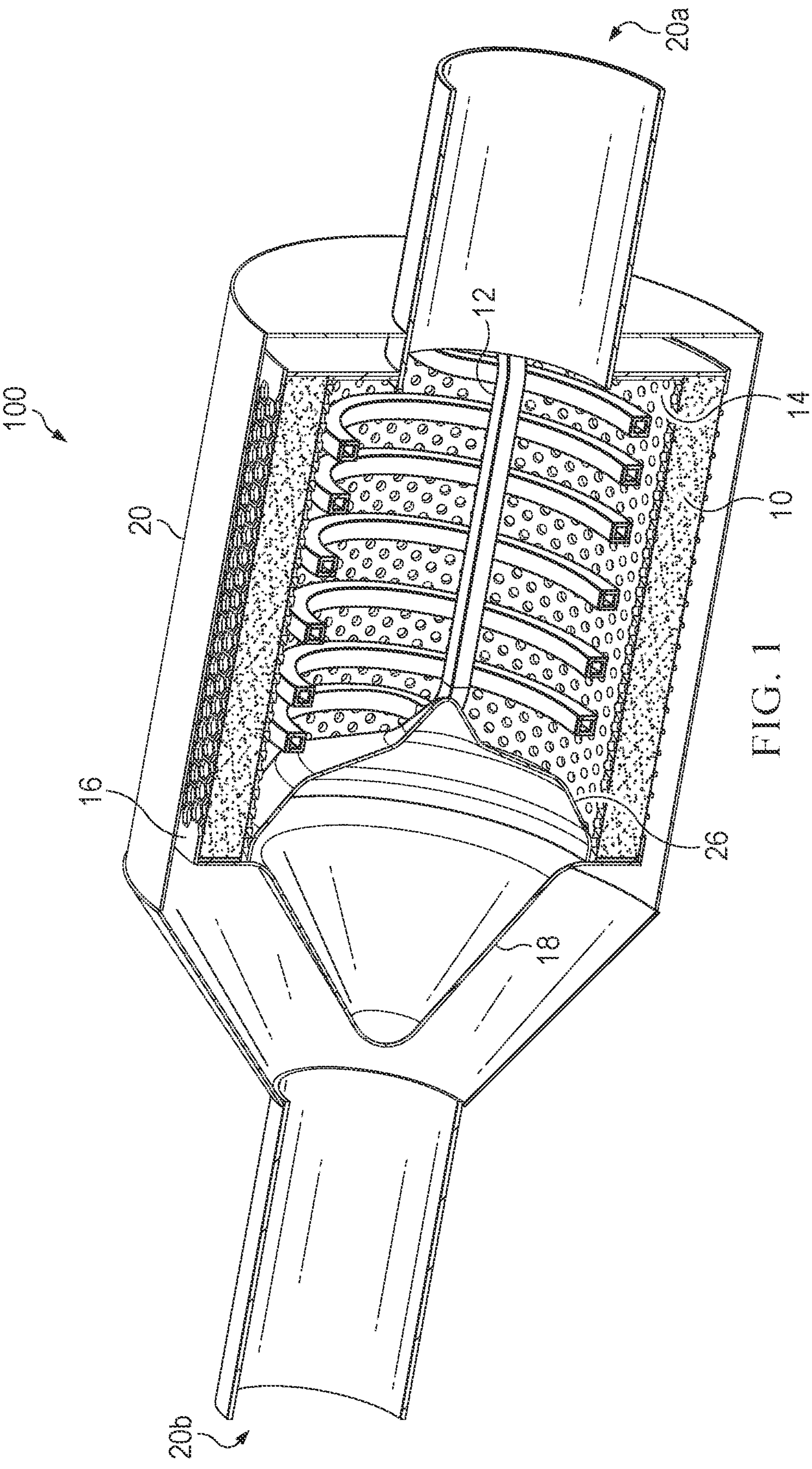
FIG. 1 is a cutaway perspective view of a catalytic element according to an embodiment of the present disclosure.
Figure 4:
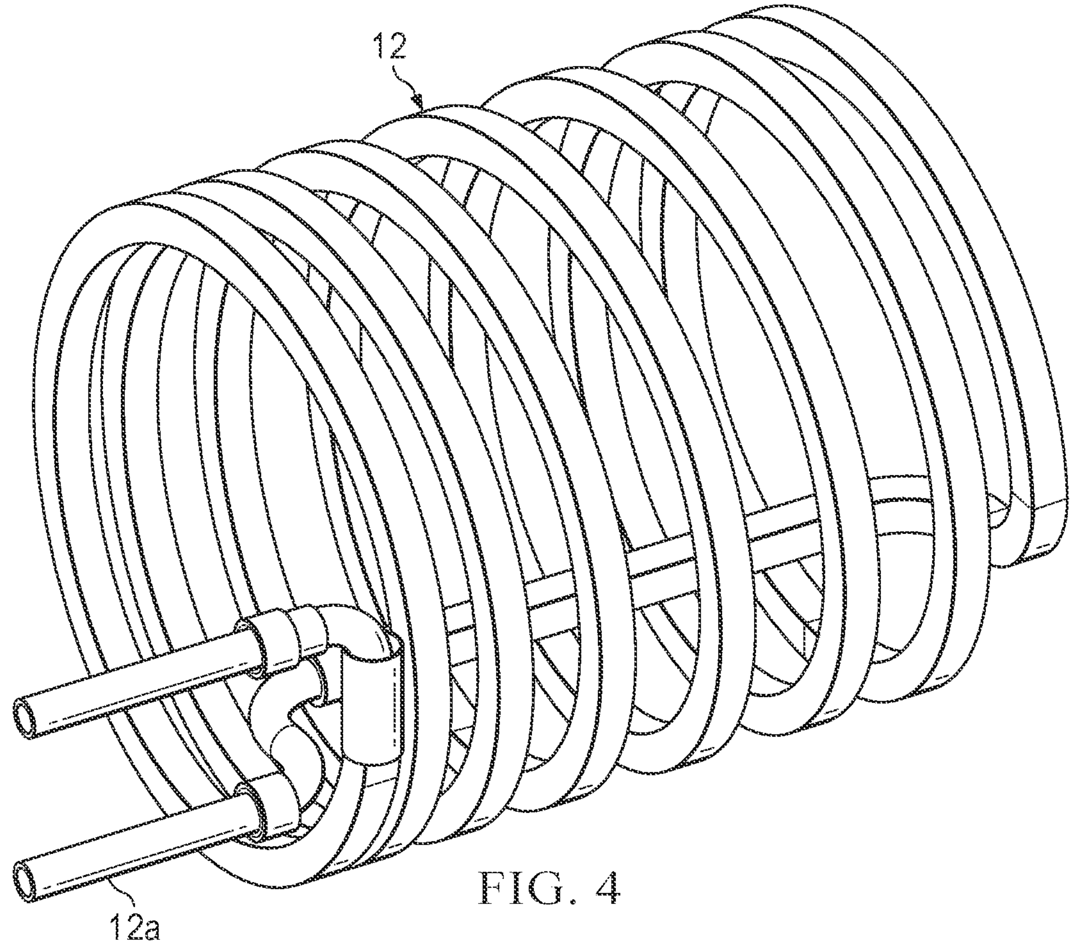
FIG. 4 is a perspective view of an inductive heater usable in a catalytic element according to an embodiment of the present disclosure.

Referring to FIG. 1, a catalytic element 100 according to an embodiment of the disclosure is shown. The catalytic element 100 includes an outer shell 20 including an inlet 20*a* through which waste gases may enter the catalytic element 100 and an outlet 20*b* through which cleaned gas can exit the catalytic element 100. An inductive heater 12 is disposed within the shell 20. The inductive heater 12 is in the form of an inductive coil. The inductive heater 12 is connected to a power source (not shown) via leads 12*a* (shown in FIGS. 2 and 4), which drives the inductive heater 12 and produces heat. The inductive heater 12 is shown in further detail in FIG. 4.

Figure 3:
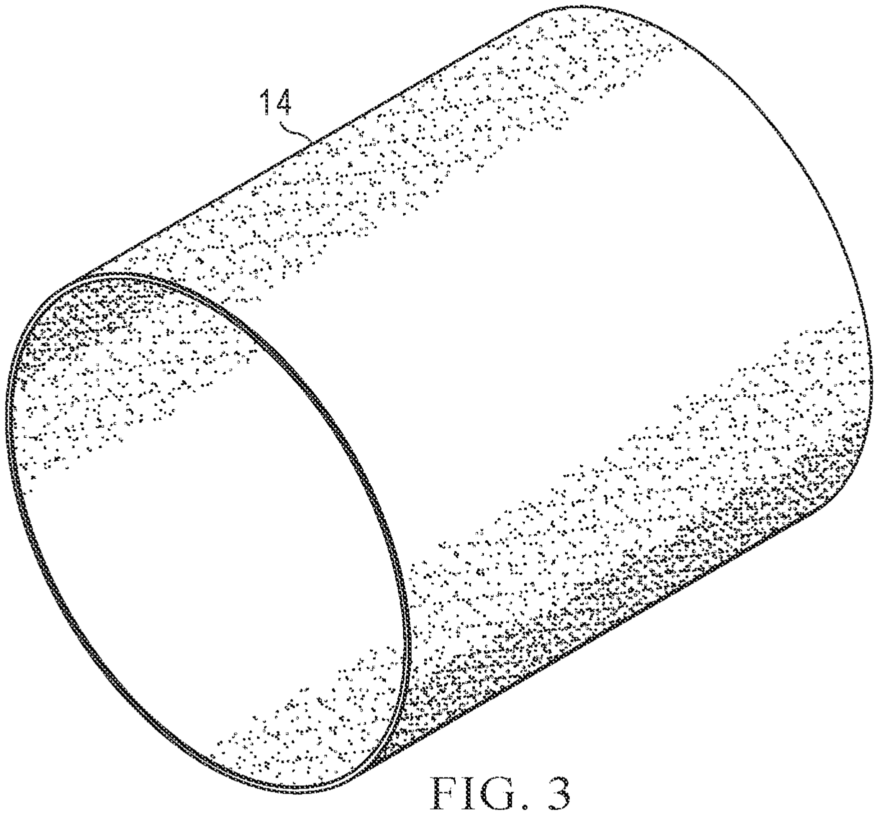
FIG. 3 is a perspective view of a metal element usable in a catalytic element according to an embodiment of the present disclosure.

Radially outside of the inductive heater is a conductive layer 14 that is thermally conductive and permeable to gas. In some embodiments, the conductive layer 14 comprises a metal or conductive polymer mesh. In some embodiments, the conductive layer 14 comprises a porous conductive polymer, conductive ceramic material, or a porous metal, such as a sintered stainless steel. In some embodiments, the conductive layer 14 is a hollow cylinder formed of sintered stainless steel. In such embodiments, the conductive layer 14 may be segmented (e.g., two semi-cylinders) or may be a single continuous body. An example of the conductive layer 14 is shown in isolation in FIG. 3. In some embodiments, the conductive layer 14 may include an additive or a catalyst (such as those described below) incorporated therein or applied thereto (e.g., coated on surfaces of the conductive layer 14). In some embodiments, the additive may include a carbon dioxide capturing agent such as calcium oxide, a nitrogen oxide (NOx) capturing agent such as a barium-containing compound, and/or a sorbent for trace metals. In some embodiments, the trace metals may include cerium.

The catalytic element 100 includes a fiber-supported catalytic layer 10 disposed on an outer surface of the conductive layer 14. The catalytic layer 10 may include inorganic fibers and a catalyst, such as those described in U.S. Patent Application Publication No. 20190309455 A1, the entire disclosure of which is incorporated herein in its entirety. In some embodiments, the catalyst includes platinum, rubidium, antimony, copper, silver, palladium, ruthenium, bismuth, zinc, nickel, cobalt, chromium, cerium, titanium, iron, vanadium, gold, and/or manganese, in element and/or compound form, wherein, if the catalyst is in compound form, the compound may include one or more than one of these elements. Without limitation, suitable inorganic fibers include alumina fibers, alumino-silicate fibers, alumina-boria-silicate fibers, alumina-zirconia-silicate fibers, zirconia-silicate fibers, zirconia fibers and similar fibers. In some embodiments, the catalytic layer 10 may have a thickness of about 25 mm, about 10-40 mm, about 15-35 mm, or about 20-30 mm. In one or more embodiments, the catalytic layer 10 may have a density of about 0.1 g/cc, about 0.05 to 0.5 g/cc, about 0.075 to 0.3 g/cc, about 0.09 to 0.25 g/cc, or about 0.1 to 0.2 g/cc.

In some embodiments, a support layer 16 is disposed around the catalytic layer 10 to provide added support. In some embodiments, the support layer 16 comprise a metal mesh or stainless-steel wire cloth. In some embodiments, the support layer 16 may be segmented (e.g., two semi-cylinders) or may be a single continuous body. In some embodiments, the support layer 16 may be formed of the same material as the conductive layer 14. That is, the catalytic element 100 may include two conductive layers 14 sandwiching the catalytic layer 10.

In some embodiments, the conductive layer 14 is formed into a cylinder either as a single body or from two or more segments, the catalytic layer 10 is wrapped around the conductive layer 14, and then the support layer 16 is secured around the catalytic layer 10. In other embodiments, the conductive layer 14 and the support layer 16 may be joined at one end leaving an interstitial space therebetween and the catalytic layer 10 is then inserted into the interstitial space (e.g., using a stuffing method).

In yet other embodiments, the catalytic layer 10 may be a hollow ceramic cylinder and the conductive layer 14 may be inserted into the hollow ceramic cylinder or sprayed onto inner surfaces of hollow ceramic cylinder. In some embodiments, the hollow ceramic cylinder may be in the form of a candle filter such as those described in U.S. Patent Application Publication Nos. 2017/0341004A1 and 2017/0320013A1, the entire disclosures of which are herein incorporated by reference in their entireties.

In operation, waste gas enters an outer shell 20 of the catalytic element 100 at the inlet 20*a* and into an interior of the inductive heater 12. The catalytic element 100 includes a sealed end portion downstream of the inductive heater 12, which forces the gas to flow radially outward through the conductive layer 14 and catalytic layer 10. In some embodiments, the sealed end portion may comprise an exhaust cone 18 and/or an internal diverter 26. In some embodiments, the sealed end portion may be integrally formed with another component of the catalytic element 100 (e.g., in the case of a hollow ceramic cylinder as the catalytic layer 10). The exhaust cone 18 and/or the internal diverter 26 may be coupled to and seal a downstream end of the conductive layer 14. In the embodiment shown in FIG. 1, the internal diverter 26 is in the shape of a cone that dilates toward the downstream direction and the exhaust cone 18 is in the shape of a cone that tapers toward the downstream direction. Other configurations may be used depending on the desired gas flow conditions. For example, a flat sealed end portion (e.g., either exhaust cone 18 and/or internal diverter 26) may be used. In some embodiments, only one of the exhaust cone 18 or the internal diverter 26 is present or neither is present in the catalytic element 100.

Figure 5:
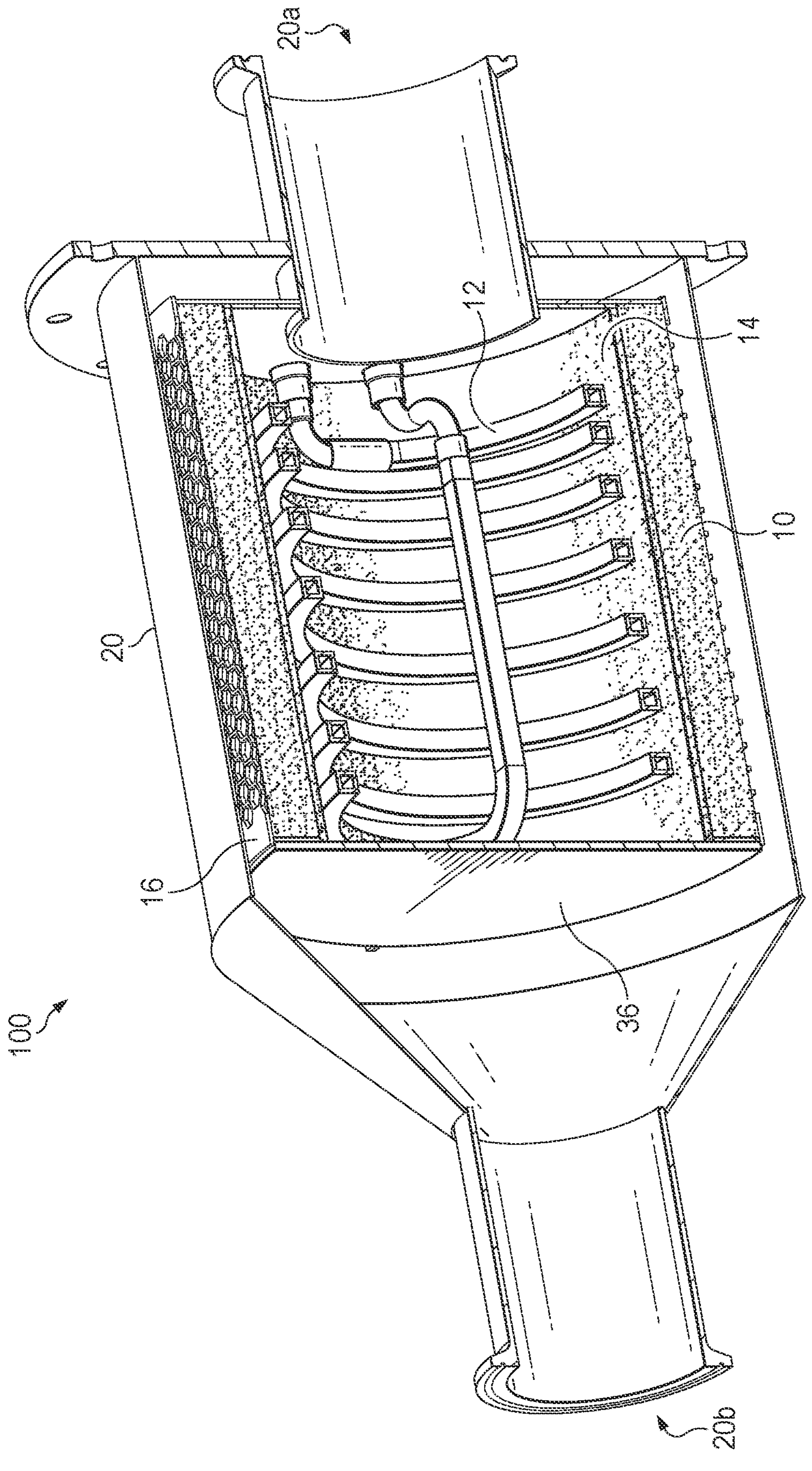
FIG. 5 is a cutaway perspective view of a catalytic element according to an embodiment of the present disclosure.

In some embodiments, the sealed end portion is in the form of a flat cap 36, as shown in FIG. 5. The cap 36 may be formed of any suitable material that is capable of restricting flow therethrough (thereby forcing the waste gas to flow radially through the catalytic layer 10).

Figure 6:
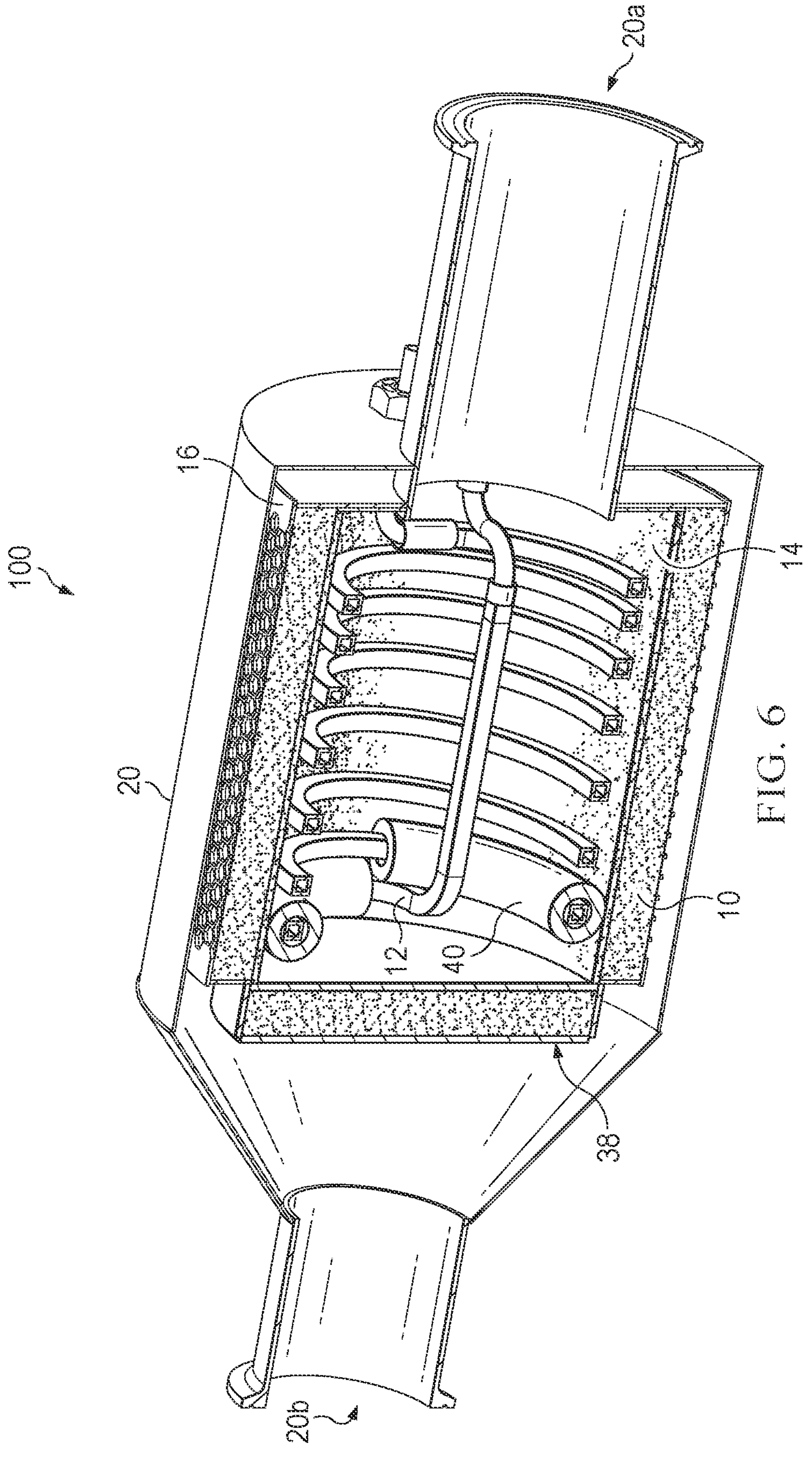
FIG. 6 is a cutaway perspective view of a catalytic element according to an embodiment of the present disclosure.
Figure 7:
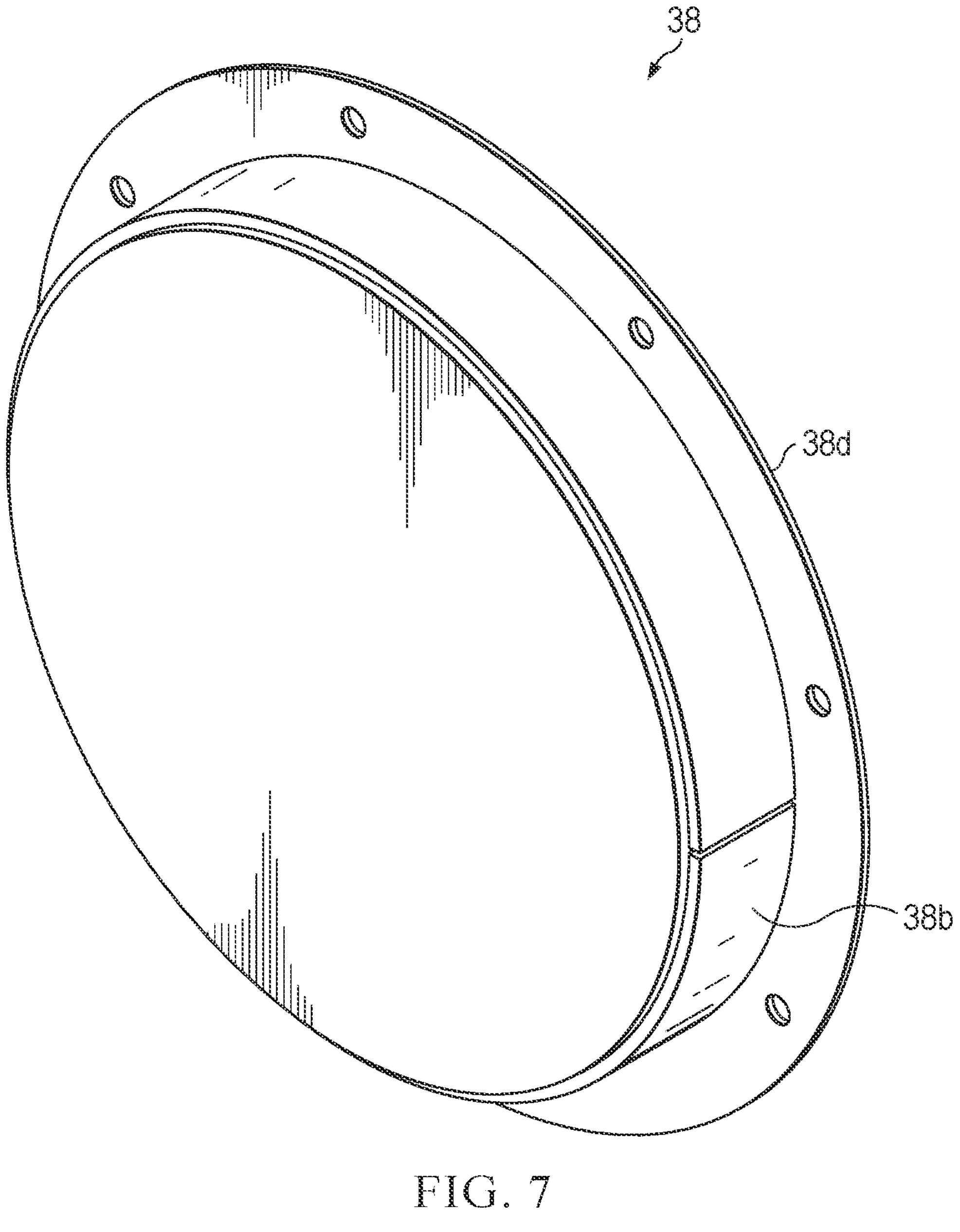
FIG. 7 is a detailed view of the active end cap shown in FIG. 6.
Figure 8:
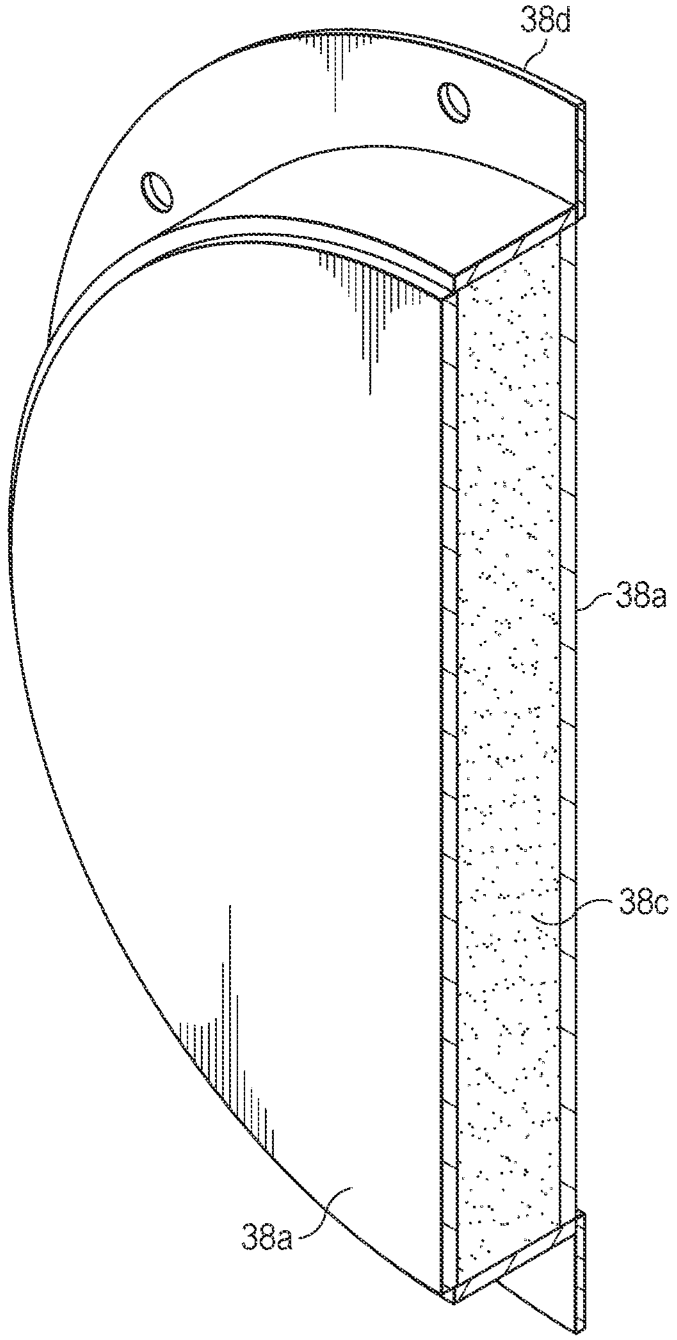
FIG. 8 is a detailed view of the active end cap shown in FIG. 6.

In other embodiments, as shown in FIG. 6, the sealed end portion may include an active end cap 38. As shown in more detail in FIG. 7 and FIG. 8, the active end cap 38 includes a permeable support 38*a* that encases an active material 38*c*. The permeable support 38*a* may be formed of the same materials as the conductive layer 14, such as sintered stainless steel. In the embodiment shown in FIGS. 6, 7, and 8, the permeable support 38*a* includes two permeable discs that are held together by a retention ring 38*b* to sandwich the active material 38*c* therebetween. The retention ring 38*b* may be permeable or non-permeable. In some embodiments, the retention ring 38*b* is continuous, non-permeable, and formed of stainless steel. In some embodiments, the permeable support 38*a* and/or the retention ring 38*b* is conductive and capable of being heated by the inductive heater 12. The active material 38*c* may be the same material as that forming the catalytic layer 10. In some embodiments, the active material 38*c* differs from the catalytic layer 10 in at least one of density, catalytic loading, or fiber composition. The active end cap may further include a flange portion 38*d* to facilitate installation of the same.

The configuration shown in FIG. 6 allows for both radially flow of the waste gas through the catalytic layer 10 and axial flow of the waste gas through the active end cap 38. Although the active end cap 38 is depicted as a flat cylinder, any suitable shape may be used, such as a cone. In some embodiments, the active end cap 38 may have a lower permeability as compared to the catalytic layer 10 and conductive layer 14, such that waste gas is preferentially directed through the catalytic layer 10. In other embodiments, the active end cap 38 may have an equal or higher permeability.

Figure 2:
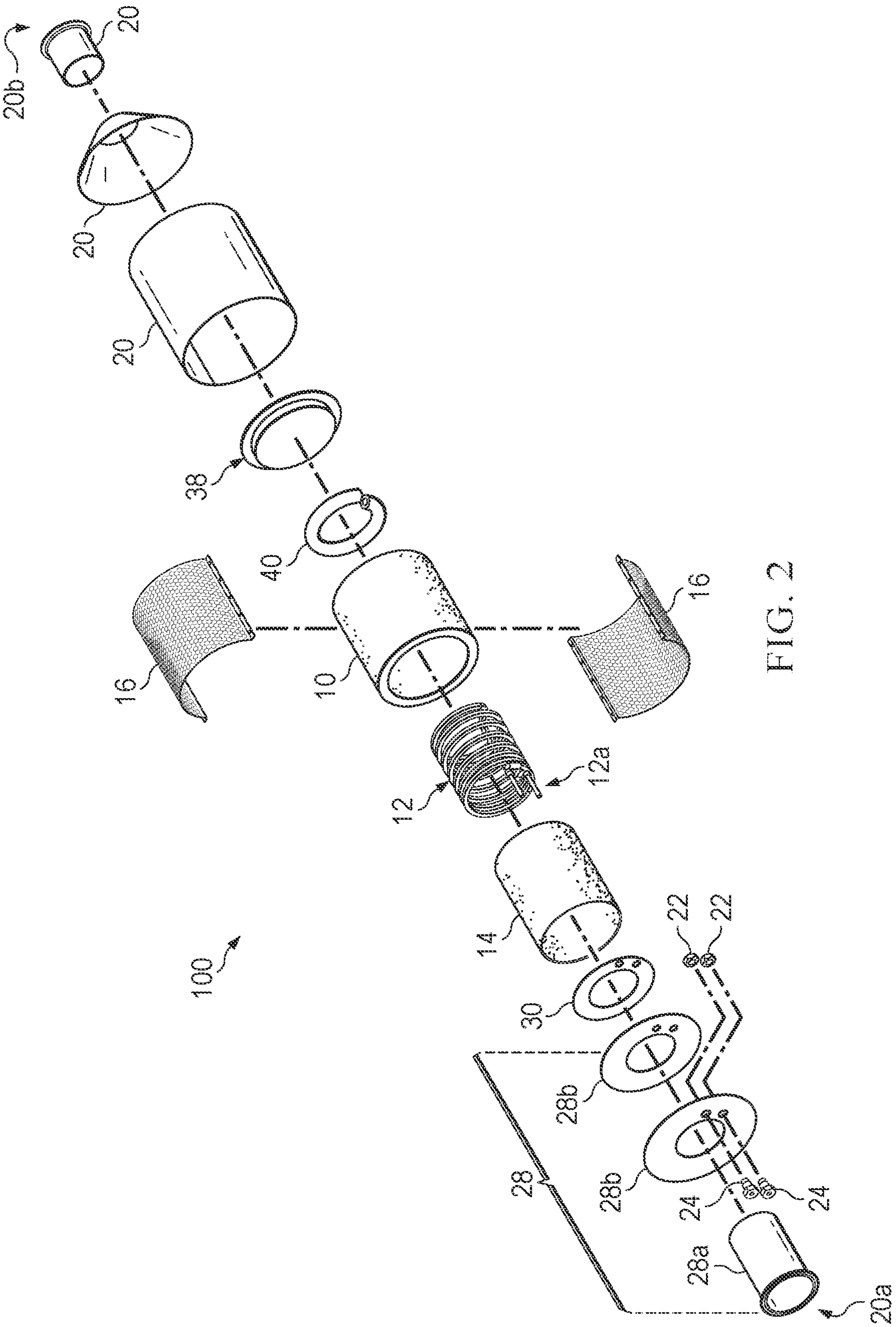
FIG. 2 is an exploded view of a catalytic element according to an embodiment of the present disclosure.

Referring to FIG. 2, the inductive heater 12 includes leads 12*a* configured to be connected to the power source. The leads 12*a* may be passed through an inlet assembly 28, the flange forming a portion of the outer shell 20. The leads 12*a* may be secured to the outer shell 20 via bushings 24 and fasteners 22. In some embodiments, the bushings 24 and/or the fasteners 22 are formed of a ceramic material, such as silicon nitride. In some embodiments, the fasteners 22 are nuts and the bushings 24 are threaded to accommodate the fasteners 22. In some embodiments, a connection of the leads 12*a* to the inlet assembly 28 is airtight, in order to avoid leakage of waste gases (i.e., such that all of the waste gases are directed through the catalytic layer 10.

As shown in FIG. 2, in some embodiments, the inlet assembly 28 includes an inlet tube 28*a* configured to allow gas to enter to the catalytic element 100. The inlet assembly 28 may also include a flange assembly 28*b* to, e.g., facilitate connection between the inlet assembly 28 and the outer shell 20. As shown in FIG. 2, the outer shell 20 may include a cylindrical portion that leads, via a conical portion, to an outlet tube. The inlet assembly 28 is connected to the remainder of the outer shell 20 and, in some embodiments, a gasket 30 may be included at a junction between the inlet assembly 28 and the remainder of the outer shell 20.

In some embodiments, the inductive heater 12 may be configured to operate for a set period of time in order to reach a light-off point of the catalytic reaction occurring in the waste gas. For example, the inductive heater 12 may be configured to operate for 1-2 seconds, up to 5 seconds, up to 10 seconds, up to 30 seconds, up to 60 seconds, 1-60 seconds, 1-15 seconds, 1-30 seconds. Limiting the operating time of the inductive heater 12 can save energy required to operate the inductive heater 12. In some embodiments, the intermittent operation of the inductive heater 12 may be automated by a controller (not shown) coupled to the inductive heater 12.

In some embodiments, the catalytic element 100 may include one or more temperature sensors (not shown) to monitor a temperature within the catalytic element 100. The temperature sensors can be used to measure the temperature of any component of the catalytic element 100 and/or the temperature of the waste gas at any location within the catalytic element 100. In some embodiments, the temperature sensors measure a temperature of the catalytic layer 10 (e.g., at a surface thereof or an interior portion thereof). In some embodiments, the temperature sensors may be coupled to a controller that controls operation of the inductive heater 12. In such embodiments, the controller may be configured to automatically shut off the inductive heater 12 when a threshold temperature (e.g., a light-off temperature) is reached and/or to automatically operate the inductive heater 12 when the temperature is below a threshold temperature (e.g., a light-off temperature). In some embodiments, the waste gas reaction is endothermic and the inductive heater 12 may be continually or intermittently run to maintain efficient reaction conditions.

During operation, the inductive heater 12 inductively heats the conductive layer 14 (and optionally other conductive components within the catalytic element 100). The heated conductive layer 14 may then transfer heat to the waste gases, the catalytic layer 10, or other components of the catalytic element 100 via one or more of conduction, convection, and/or radiation.

In some embodiments, as shown in FIGS. 2 and 6, an isolator 40 may be included in the catalytic element 100. The isolator 40 is non-conductive and heat-resistant and may prevent the inductive heater 12 from coming into contact with other metal or conductive components of the catalytic element 100. In some embodiments, the isolator 40 may cover an end portion, both end portions, a middle portion, or the entire surface of the inductive heater 12.

The catalytic element 100 described herein may be employed in a variety of applications. For example, in some embodiments, the catalytic element 100 may be a catalytic converter for an internal combustion engine vehicle. In other embodiments, the catalytic element 100 may be used in connection with industrial processes (e.g., exhaust gas remediation).

A method of using the catalytic element 100 is also disclosed herein. The method includes introducing a gas through the inlet 20*a* of the catalytic element 100, through the catalytic layer 10, and out of the outlet 20*b*. The gas may include unburned hydrocarbons or volatile organic compounds and these components of the gas may undergo a catalytic reaction (e.g., oxidation or reduction) at the catalytic layer 10 (e.g., as the gas passes through the catalytic layer 10). The inductive heater 12 may be operated as described above to heat the conductive layer 14 (and/or the support layer 16). The conductive layer 14 may then transfer heat to the gas, the catalytic layer 10, or other components of the catalytic element 100 via one or more of conduction, convection, and/or radiation. In some embodiments, this heating is performed until the catalytic layer 10 (or some other component of the catalytic element 100) reaches a light-off temperature for the catalytic reactions. In some embodiments, a temperature sensor may be used to determine when the light-off temperature has been reached and, optionally, a controller may be used to automatically cycle the inductive heater 12 to maintain a desired temperature range about the light-off temperature.

By introducing heat into the catalytic element 100 via the inductive heater 12, the amount of untreated gas being exhausted may be greatly reduced. That is, components of the catalytic element 100 may be pre-heated to (or near) a light-off temperature of the catalytic reactions such that these reactions may immediately begin as gas is introduced. Further, due to the low weight of the catalytic layer 10, heating occurs rapidly, thereby saving energy and increasing efficiency.

Although the present disclosure has been described using preferred embodiments and optional features, modification and variation of the embodiments herein disclosed can be foreseen by those of ordinary skill in the art, and such modifications and variations are considered to be within the scope of the present disclosure. It is also to be understood that the above description is intended to be illustrative and not restrictive. For instance, it is noted that the diameter, length, thickness, and density values described above are illustrative only and can be readily adjusted by one of ordinary skill in the art to fit a wide range of potential reactors and processes. Many alternative embodiments will be apparent to those of ordinary skill in the art upon reviewing the above description. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the disclosure.

What is claimed is:

1. A device comprising:

a housing;

an inductive heater disposed within the housing;

a conductive layer disposed within the housing radially outside of the inductive heater, wherein the conductive layer is gas permeable and thermally conductive; and a catalytic layer disposed within the housing around the conductive layer, wherein the catalytic layer comprises inorganic fibers and a catalyst;

wherein the conductive layer is configured to transfer heat from the inductive heater to the catalytic layer.

2. The device of claim 1, further comprising an end cap sealing one end of the conductive layer.

3. The device of claim 2, wherein the end cap is not gas permeable.

4. The device of claim 3, wherein the end cap is conical.

5. The device of claim 2, wherein the end cap comprises a permeable catalytic layer.

6. The device of claim 1, wherein the inorganic fibers comprise alumina fibers, alumino-silicate fibers, alumina-boria-silicate fibers, alumina-zirconia-silicate fibers, zirconia-silicate fibers, zirconia fibers, or combinations thereof.

7. The device of claim 1, wherein the catalyst comprises platinum, rubidium, antimony, copper, silver, palladium, ruthenium, bismuth, zinc, nickel, cobalt, chromium, cerium, titanium, iron, vanadium, gold, manganese, or combinations thereof.

8. The device of claim 1, further comprising a support layer secured radially outside and about the catalytic layer.

9. The device of claim 8, wherein the support layer or the conductive layer comprises a catalyst.

10. The device of claim 1, further comprising a non-conductive isolator covering at least a portion of the inductive heater.

11. The device of claim 1, wherein the device is configured to treat gas comprising unburned hydrocarbons or volatile organic compounds.

12. The device of claim 11, wherein the device is a catalytic converter for a vehicle.

13. A method comprising:

introducing a gas into an inlet of an emissions control device, the emissions control device comprising:

a housing comprising the inlet and an outlet;

an inductive heater disposed within the housing;

a conductive layer disposed within the housing radially outside of the inductive heater, wherein the conductive layer is gas permeable and thermally conductive; and a catalytic layer disposed within the housing around the conductive layer, wherein the catalytic layer comprises inorganic fibers and a catalyst;

wherein the catalytic layer forms a permeable seal between the inlet and the outlet;

using the inductive heater, heating the conductive layer;

transferring heat from the conductive layer to the catalytic layer or the gas via conduction, convection, and/or radiation;

catalytically oxidizing or reducing components of the gas at the catalytic layer; and exhausting the oxidized or reduced gas through the outlet of the emissions control device.

14. The method of claim 13, wherein the gas comprises unburned hydrocarbons or volatile organic compounds that are oxidized or reduced at the catalytic layer.

15. The method of claim 13, wherein the emissions control device further comprises a support layer secured radially outside and about the catalytic layer.

16. The method of claim 15, wherein the support layer or the conductive layer comprises a catalyst.

17. The method of claim 13, wherein the emissions control device comprises a temperature sensor proximate the catalytic layer and a controller in communication with the temperature sensor and configured to control operation of the inductive heater; and wherein heating the conductive layer comprises intermittently operating the inductive heater via the controller to maintain a predetermined temperature range as measured by the temperature sensor.

18. The method of claim 17, wherein the predetermined temperature range comprises a light-off temperature of a catalytic oxidation or reduction reaction occurring in the catalytically oxidizing or reducing step.

19. The method of claim 13, wherein the emissions control device comprises a controller configured to control operation of the inductive heater; and wherein heating the conductive layer comprises intermittently operating the inductive heater via the controller at predetermined intervals.

20. The method of claim 13, wherein the gas is exhaust gas from a vehicle and the emissions control device is a catalytic converter.

* * * * *